United States Patent [19]
Fujii

[11] Patent Number: 5,303,973
[45] Date of Patent: Apr. 19, 1994

[54] FRONT BODY STRUCTURE OF VEHICLE

[75] Inventor: Yoshio Fujii, Hiroshima, Japan

[73] Assignee: Mazda Motor Corporation, Hiroshima, Japan

[21] Appl. No.: 82,521

[22] Filed: Jun. 25, 1993

Related U.S. Application Data

[63] Continuation of Ser. No. 852,961, Mar. 17, 1992, abandoned.

[30] Foreign Application Priority Data

Oct. 15, 1991 [JP] Japan .................. 3-265724
Mar. 28, 1992 [JP] Japan .................. 3-064961

[51] Int. Cl.⁵ ............................................. B62D 25/08
[52] U.S. Cl. ..................................... 296/194; 296/35.1
[58] Field of Search ..................... 296/35.1, 194, 203

[56] References Cited

U.S. PATENT DOCUMENTS

| | | | |
|---|---|---|---|
| 4,560,198 | 12/1985 | Katano et al. | 296/194 X |
| 4,750,780 | 6/1988 | Harasaki et al. | 296/194 X |
| 4,962,961 | 10/1990 | Ito et al. | 296/194 X |
| 4,964,672 | 10/1990 | Fujii | 296/194 X |
| 5,052,742 | 10/1991 | Akoshima et al. | 296/194 X |
| 5,106,148 | 4/1992 | Ikeda et al. | 296/194 |

Primary Examiner—David M. Mitchell
Assistant Examiner—Andrew C. Pike
Attorney, Agent, or Firm—Sixbey, Friedman, Leedom & Ferguson

[57] ABSTRACT

A front body structure of a vehicle body having a chassis and a body which is formed separately from the chassis and is mounted thereon includes a shroud panel which forms a side portion of the front portion of the body. A wheel apron is connected to the shroud panel at its front portion and a body strength member is connected to a rear portion of the wheel apron. An apron reinforcement extends in the longitudinal direction of the vehicle body and is connected to the shroud panel at a front portion and to the body strength member at a rear portion. A first mount portion for mounting the body on the chassis is provided in the lower portion of the shroud panel and a second mount portion for mounting the body on the chassis is provided near the connection of the body strength member to the wheel apron. A frame extends along the outer side edge portion of the shroud panel to the body strength member and is connected to the connection of the shroud panel and the apron reinforcement at an intermediate portion thereof.

3 Claims, 5 Drawing Sheets ns and description5,303,973

FRONT BODY STRUCTURE OF VEHICLE

This application is a continuation of Ser. No. 07/852,961, filed Mar. 17, 1992, now abandoned.

BACKGROUND OF THE INVENTION

1. Field of the Invention

This invention relates to a front body structure of a vehicle, and more particularly to a front body structure of a vehicle of a type in which the body is mounted on a chassis.

2. Description of the Prior Art

There has been known a vehicle body of a chassis frame structure comprising a chassis and a body mounted on the chassis. In such a vehicle body, a major strength of the vehicle is basically carried by the chassis, and a pair of mount portions supported by the chassis are often provided in front of and behind each front wheel apron. As the body side elements associated with the mount portions, there are a shroud panel which is connected to the forward portion of the wheel apron and forms a side portion of the front portion of the vehicle body, a hinge pillar connected to the rear sides of the wheel apron, a side sill and the like in addition to the wheel apron.

There has been known a shroud panel comprising a base panel, an upper member provided on the upper portion of the base panel, a side member provided on the inner side edge portion of the base panel, and the like. The wheel apron is generally provided with a apron reinforcement which extends in the longitudinal direction of the vehicle body.

When the vehicle running a rough road, vertical vibration acts between the mount portions in the body on the chassis, and accordingly, it is required that the body itself has a sufficient rigidity. In order to increase the rigidity of the body itself, the rigidity of the part around the front wheel apron must be increased. However when the shroud panel and/or the wheel apron are simply provided with additional reinforcement, satisfactory effect cannot be effected for increase in weight of the vehicle body. Particularly in the case of the vehicle body of chassis frame structure, it is not preferred that additional reinforcements are provided in a large weight since the chassis itself is heavy.

SUMMARY OF THE INVENTION

In view of the foregoing observations and description, the primary object of the present invention is to provide a front body structure of a vehicle having a chassis in which the rigidity of the part around the front wheel apron can be increased without much increasing the overall weight of the vehicle body.

The front body structure of the present invention comprises a shroud panel which forms a side portion of the front portion of the vehicle body, a wheel apron which is connected to the shroud panel at its front portion, a body strength member which is connected to a rear portion of the wheel apron, an apron reinforcement which extends in the longitudinal direction of the vehicle body and is connected to the shroud panel at a front portion and to the body strength member at a rear portion, a first mount portion provided in the lower portion of the shroud panel and a second mount portion provided near the connection of the body strength member to the wheel apron, and is characterized by having a frame which extends along the outer side edge portion of the shroud panel to the body strength member and is connected to the connection of the shroud panel and the apron reinforcement at an intermediate portion thereof.

In this specification, the term "the body strength member" means a member which can support the mount portion such as a hinge pillar or a side sill having a closed cross-section or a floor panel.

The frame may be formed integrally with the apron reinforcement or separately therefrom.

When the frame is provided, the first and second mount portions are connected by the frame on the body side and the body strength member as well as by the chassis. Further since the frame extends along the outer side edge portion of the shroud panel, the strength against the vertical vibration of the shroud panel, the wheel apron and the body strength member between the first and second mount portions can be efficiently increased.

Thus in accordance with the present invention, the rigidity of the part around the front wheel apron can be effectively increased by a relatively small number of reinforcements.

The front portion of the frame may be formed integrally with a cross member which extends in the transverse direction of the vehicle body from the first mount portion.

With this arrangement, the number of elements of the frame can be reduced and accordingly, the rigidity of the part around the front wheel apron can be effectively increased without substantially increasing the overall weight of the vehicle body.

The body strength member may comprise a hinge pillar which extends in the vertical direction and a side sill which extends in the longitudinal direction of the vehicle body and is connected to the hinge pillar at the front portion, and the rear end portion of the frame may be connected to a portion near the connection of the hinge pillar to the side sill.

With this arrangement, the rigidity of the vehicle body can be increased more effectively since the rear end portion of the frame is connected to a portion near the connection of two body strength members, the hinge pillar and the side sill, which is very high in rigidity.

DESCRIPTION OF THE PREFERRED EMBODIMENT

Figure 1:
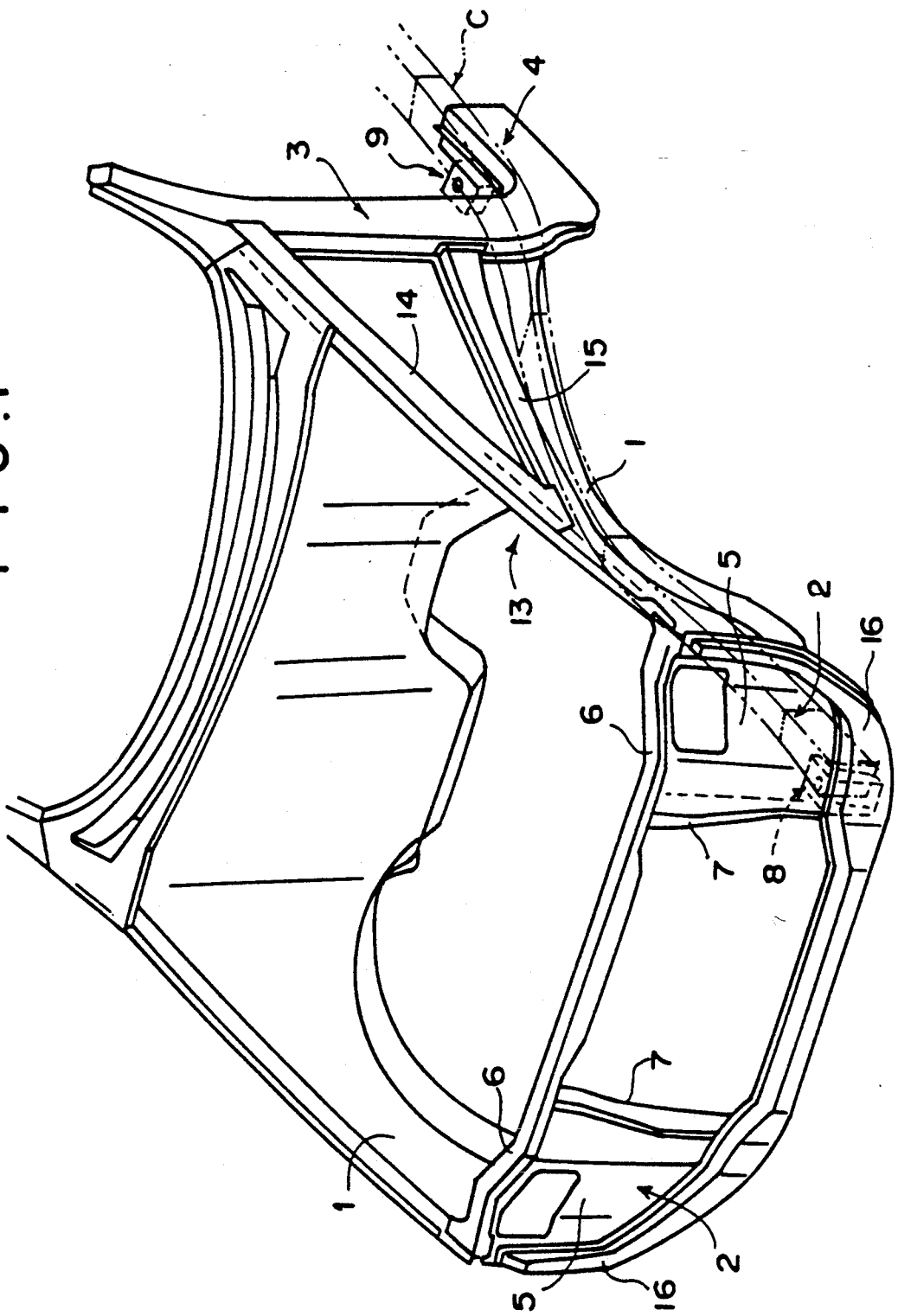
FIG. 1 is a schematic perspective view showing a front body structure in accordance with an embodiment of the present invention.

As shown in FIG. 1, a front body structure in accordance with an embodiment of the present invention, which is a structure for a vehicle body having a chassis, comprises a wheel apron 1, a shroud panel 2 which is connected to the forward portion of the wheel apron 1 and forms a side portion of the front portion of the vehicle body, a hinge pillar 3 connected to the rear sides of the wheel apron 1, a side sill 4 which extends rearward from the lower end of the hinge pillar 3. The hinge pillar 3 and the side sill 4 are the body strength members.

Figure 3:
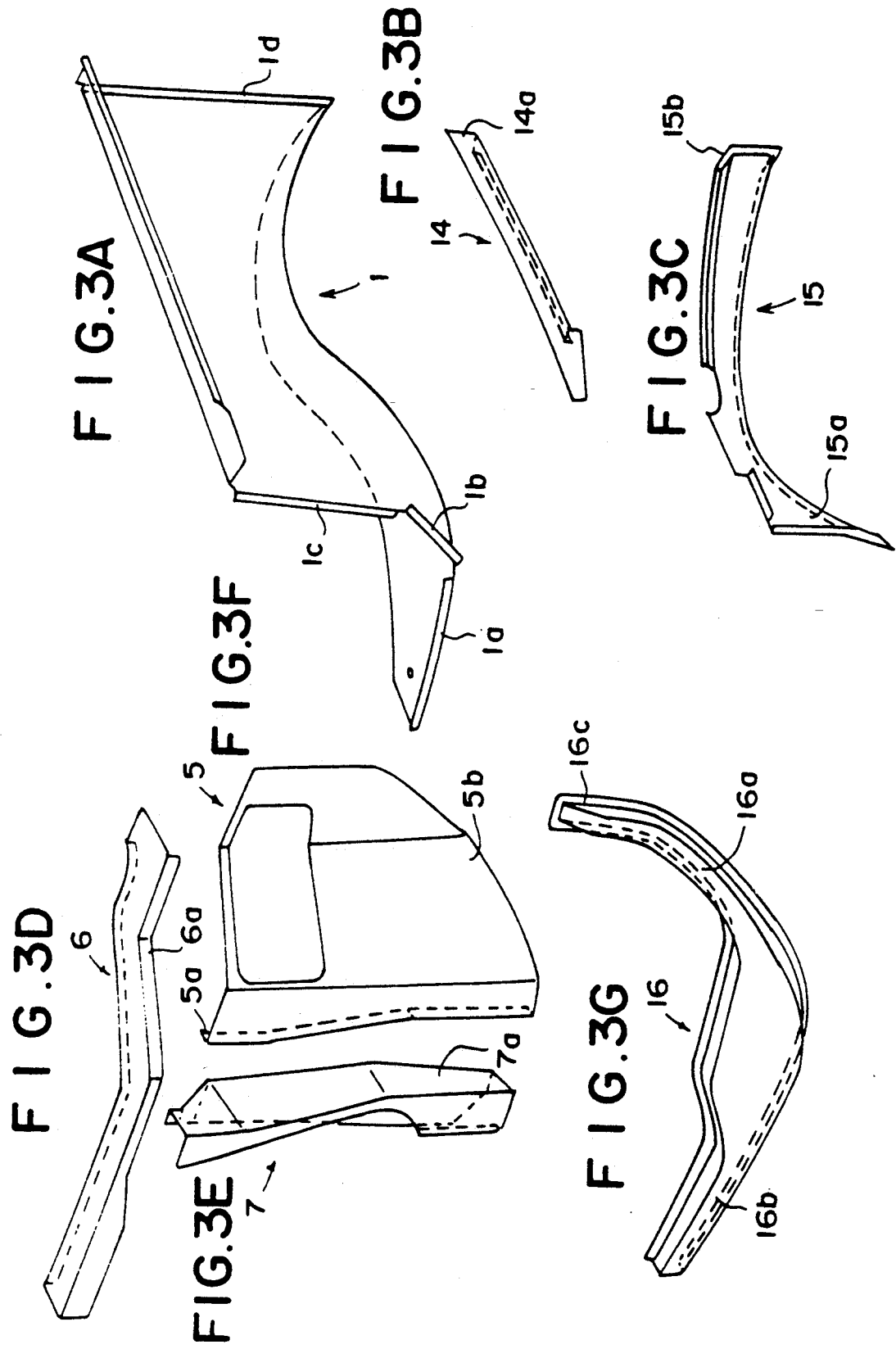
FIG. 3A is a perspective view of the wheel apron of the front body structure in accordance with an embodiment of the present invention.
FIG. 3B is a perspective view of a first panel which forms the apron reinforcement in accordance with the embodiment of the present invention.
FIG. 3C is a perspective view of a second panel which forms the apron reinforcement in accordance with the embodiment of the present invention.
FIG. 3D is a perspective view of the upper panel which forms the apron reinforcement in accordance with the embodiment of the present invention.
FIG. 3E is a perspective view of the side panel which forms the apron reinforcement in accordance with the embodiment of the present invention.
FIG. 3F is a perspective view of the base panel which forms the apron reinforcement in accordance with the embodiment of the present invention.
FIG. 3G is a perspective view of the cross member which forms the apron reinforcement in accordance with the embodiment of the present invention.

The shroud panel 2 comprises a base panel 5, an upper panel 6 and a side member 7 shown in FIGS. 3F, 3D and 3E. The base panel 5 has a flange 5a and the flange 5a is welded to a side surface 7a of the side member 7. The upper member 6 has a flange 6a on the front face thereof and the flange 6a is welded to the upper end of the side member 7.

Figure 2:
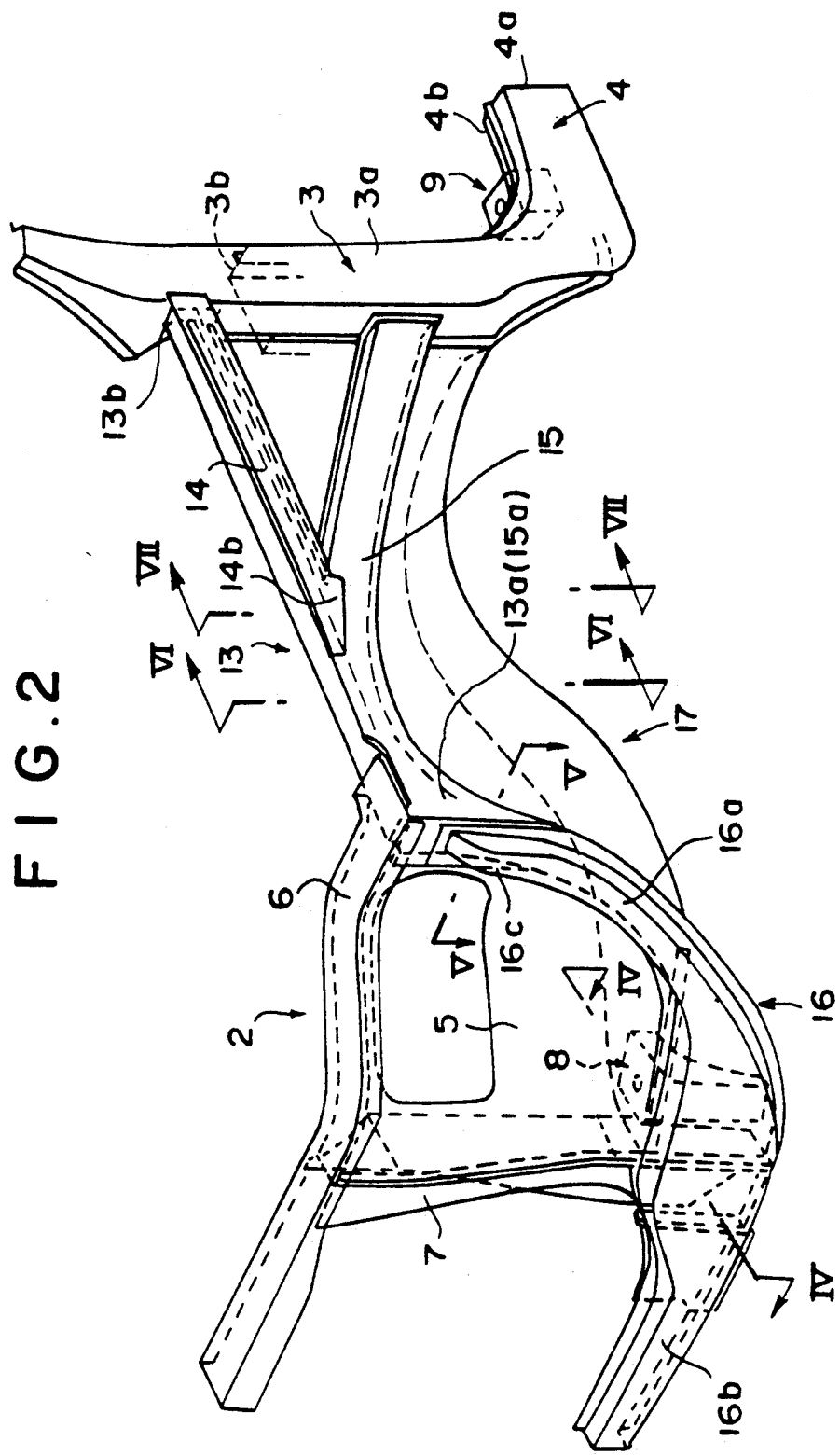
FIG. 2 is a perspective view of the major part of the front body structure.

As shown in in FIG. 3A, the wheel apron 1 is formed of a steel plate and has three flanges 1a, 1b and 1c on the front end thereof and a flange 1d on the rear end thereof. The front flanges 1a, 1b and 1c are welded on the rear surface of the base panel 5 and the rear flange 1d is welded to the hinge pillar 3. As shown in FIG. 2, the hinge pillar 3 comprises outer and inner panels 3a and 3b which are welded together to form a closed cross-section. Similarly, the side sill 4 comprises outer and inner panels 4a and 4b which are welded together to form a closed cross-section. In this particular embodiment, the outer panels 3a and 4a of the hinge pillar 3 and the side sill 4 are formed integrally with each other.

Figure 4:
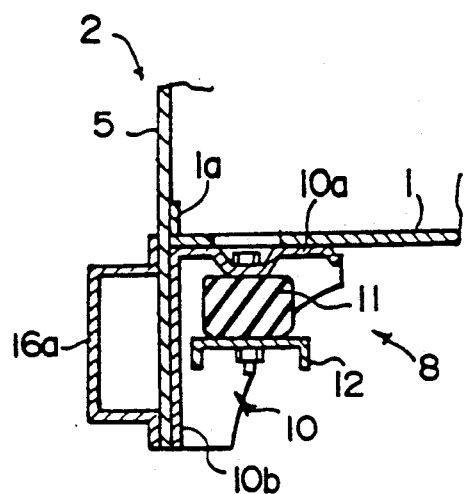
FIG. 4 is a cross-sectional view taken along line IV—IV in FIG. 2.

As shown in FIGS. 1 and 2, a first mount portion 8 is provided on the lower portion of the shroud panel 2 and a second mount portion 9 is provided on the inner side of the side sill 4. As clearly shown in FIG. 4, the wheel apron 1 and the shroud panel 2 are mounted on the chassis C (FIG. 1) at the first mount portion 8 by way of a mount bracket 10. The mount bracket 10 has its upper surface 10a welded to the lower surface of the wheel apron 1 and its side surface 10b welded to the rear surface of the base panel 5. A chassis bracket 12 which is connected to the chassis C at one end is secured to the mount bracket 10 with a rubber mount 11 positioned therebetween. The second mount portion 9 is substantially the same structure as the first mount portion 8.

Figure 6:
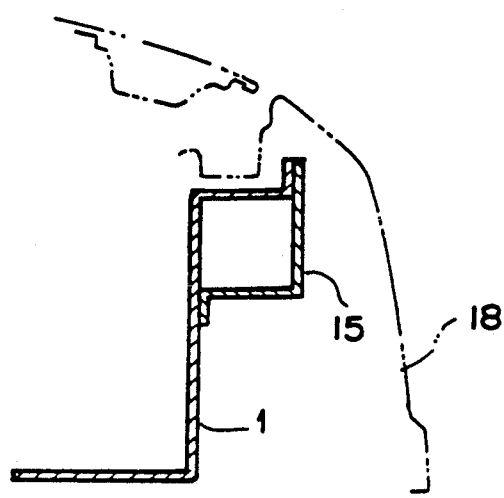
FIG. 6 is a cross-sectional view taken along line VI—VI in FIG. 2.
Figure 7:
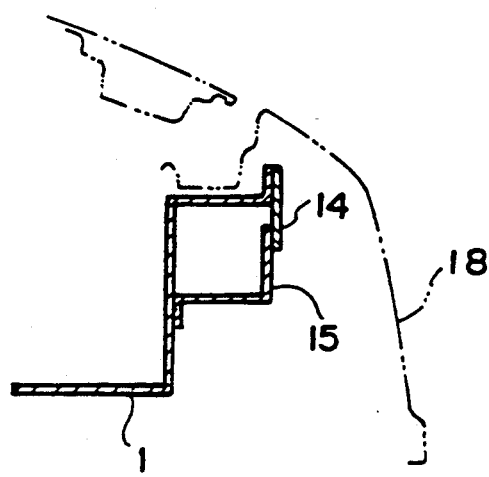
FIG. 7 is a cross-sectional view taken along line VII—VII in FIG. 2.

As shown FIG. 2, an apron reinforcement 13 is provided on the wheel apron 1 and is connected to the shroud panel 2 at its front end portion 13a and to the hinge pillar 3 at its rear end portion 13b. The apron reinforcement 13 is formed of a first panel 14 which is L-shaped in cross-section as shown in FIG. 3B and a second panel 15 which has a front portion L-shaped in cross-section and a rear portion channel-shaped in cross-section as shown in FIG. 3C. The first panel 14 is welded to the wheel apron 1 to form a closed cross-section as can be understood from FIG. 2. The rear end 14a of the first panel 14 is welded to the hinge pillar 3 and the front 14b of the first panel 14 is welded to an intermediate portion of the second panel 15. As shown in FIGS. 6 and 7, the second panel 15 is welded to the wheel apron 1 to form a closed cross-section and is further welded to the shroud panel 2 and the hinge pillar 3 at the front and rear end portions 15a and 15b. In FIGS. 6 and 7, reference numeral 18 denotes a front fender.

Figure 5:
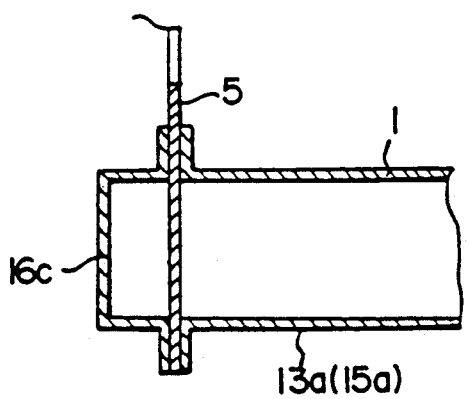
FIG. 5 is a cross-sectional view taken along line V—V in FIG. 2.

As shown in FIG. 2, on the front surface of the shroud panel 2 is connected a cross member 16 which is channel-shaped in cross-section and is bent at each portion 16a thereof as shown in FIG. 3G (see FIG. 1 also). The end portion 16a of the cross member 16 extends along the outer edge portion 5b of the base panel 5 of the shroud panel 2 and is welded to the base panel 5 to form a closed cross-section. The extreme end 16C of the end portion 16a extends to the connection of the base panel 5 of the shroud panel 2 and the front end portion of the apron reinforcement 13 (see FIG. 5 also). The straight portion 16b of the cross member 16 extends in the transverse direction of the vehicle body along the lower side of the shroud panel 2.

Thus, in this embodiment, a frame 17 extends from the first mount portion 8 to the side sill 4 along the outer edge portion 5b of the base panel 5 of the shroud panel 2 and through the connection of the shroud panel 2 and the apron reinforcement 13. With this frame 17, the rigidity of the vehicle body can be effectively increased. Further, in this particular embodiment, since the frame 17 is formed integrally with the cross member 16, the apron reinforcement 13 and the like, increase in number of the elements and in weight of the vehicle body is minimized.

Though only the left half of the vehicle body is described above, the right half of the vehicle body is of the same structure.

Though, in the embodiment described above, the frame 17 is formed integrally with a part of the cross member 16, the apron reinforcement 13, these members may be separate from each other. Further, the frame may be of a single member.

Though, in the embodiment described above, the rear end portion of the frame is connected to the hinge pillar, it may be connected other body strength members.

Further the manner for connecting the shroud panel and the apron reinforcement or their shapes may be changed according to the vehicle body.

What is claimed is:

1. A front body structure of a vehicle formed separately from a chassis of the vehicle and mounted thereon, said front body structure comprising
a shroud panel which forms a side portion of a front portion of the front body structure, a wheel apron having a front portion thereof connected to the shroud panel, a body strength member which is connected to a rear portion of said wheel apron, an apron reinforcement extending in a longitudinal direction of the vehicle having a front portion thereof connected to said body strength member, a first mounting means for mounting the front body structure on the chassis, said first mounting means being provided in a lower portion of the shroud panel, a second mounting means for mounting the front body structure on the chassis, said second mounting means being provided near a connection between said body strength member and said wheel apron, and a frame extending along an outer side edge portion of said shroud panel to said body strength member, said frame comprising a member which is connected to the shroud panel to form a closed cross section in conjunction with the shroud panel along the outer side edge portion of the shroud panel, and a panel member having a front portion connected to the shroud panel and a rear portion connected to the body strength member, said panel member constituting a part of the apron reinforcement and being connected to the wheel apron to form a closed cross section in conjunction with the wheel apron, said frame being connected to a connection between said shroud panel and said apron reinforcement at an intermediate portion thereof.

2. A front body structure as defined in claim 1 in which a front portion of said frame is formed integrally with a cross member which extends in a transverse direction of the vehicle from the first mounting means.

3. A front body structure as defined in claim 1 or 2 in which said body strength member comprises a hinge pillar which extends in a vertical direction and a side sill which extends in the longitudinal direction of the vehicle, a front portion of said side sill being connected to the hinge pillar, and a rear end portion of said frame is connected to a portion near a connection of said hinge pillar to said side sill.

* * * * *

UNITED STATES PATENT AND TRADEMARK OFFICE
CERTIFICATE OF CORRECTION

PATENT NO. : 5,303,973
DATED : April 19, 1994
INVENTOR(S) : Yoshio Fujii

It is certified that error appears in the above-identified patent and that said Letters Patent is hereby corrected as shown below:

Title page, item ;
[30]     Foreign Application Priority Data
    Mar. 28, 1991 [JP]   Japan ................ 3-064961
    Oct. 15, 1991 [JP]   Japan ................ 3-265724

Signed and Sealed this

Thirteenth Day of September, 1994

Attest:

BRUCE LEHMAN

*Attesting Officer*      *Commissioner of Patents and Trademarks*